United States Patent [19]
Eum

[11] Patent Number: 5,633,690
[45] Date of Patent: May 27, 1997

[54] AUTOMATIC GAIN CONTROL CIRCUIT OF A VIDEO PROCESSING SYSTEM AND METHOD THEREFOR

[75] Inventor: Doo-Chan Eum, Suwon, Rep. of Korea

[73] Assignee: Samsung Electronics Co., Ltd., Kyungki-Do, Rep. of Korea

[21] Appl. No.: 366,905

[22] Filed: Dec. 30, 1994

[30] Foreign Application Priority Data

Dec. 30, 1993 [KR] Rep. of Korea ............... 31322.1993

[51] Int. Cl.$^6$ ............................................. H04N 5/52
[52] U.S. Cl. ........................... 348/678; 348/737; 348/738; 348/731
[58] Field of Search .................... 348/757–738, 348/678, 707, 731; H04N 5/52, 5/53, 5/60, 5/62

[56] References Cited

U.S. PATENT DOCUMENTS

| | | | |
|---|---|---|---|
| 4,141,042 | 2/1979 | Orii | 358/195 |
| 4,511,924 | 4/1985 | Griffis et al. | 348/737 |
| 4,884,141 | 11/1989 | Hyakutake | 348/678 |
| 4,974,087 | 11/1990 | Rumreich | 348/738 |

FOREIGN PATENT DOCUMENTS 94006244 11/1994 WIPO ............................. H04N 5/52

*Primary Examiner*—Glenton B. Burgess
*Attorney, Agent, or Firm*—Sughrue, Mion, Zinn, Macpeak & Seas

[57] ABSTRACT

An automatic gain control circuit for controlling gain according to a sound gain controller so as to output a stable video intermediate frequency signal includes a first gain control amplifier receiving a video intermediate frequency signal, for amplifying the signal by a sound gain control voltage and for then producing an amplified video intermediate frequency signal, a second gain control amplifier receiving a carrier signal having a sound intermediate frequency signal and a video intermediate frequency signal, for amplifying the carrier signal by the sound gain control voltage and for then providing the amplified carrier signal, and a sound gain control voltage detecting circuit for receiving the amplified signal from the second gain control amplifier, for detecting the sound gain control voltage and for then providing the detected sound gain control voltage to thereby automatically control the gain of said first gain control amplifier. A method for operating an automatic gain control amplifier is also described.

10 Claims, 2 Drawing Sheets

5,633,690

AUTOMATIC GAIN CONTROL CIRCUIT OF A VIDEO PROCESSING SYSTEM AND METHOD THEREFOR

BACKGROUND OF THE INVENTION

1. Field of the Invention

The present invention relates to an automatic gain control circuit for a video processing system and, more particularly, to an automatic gain control circuit which automatically controls gain by using a sound gain controller so as to stably output a video intermediate frequency signal.

The instant application is based on Korean Patent Application No. 93-31322, which is incorporated herein by reference for all purposes.

2. Discussion of Related Art

Typically, an automatic gain control circuit is used, for example, in the television arts to automatically control the gain of an amplifier in a receiving apparatus, preventing changes in output level of the amplifier even when an input level thereto is changed. The receiving apparatus may be an audio or a video system, as well as a communication apparatus.

FIG. 1 is a circuit diagram of a conventional automatic gain control (AGC) circuit. When a video intermediate frequency signal is input through an input terminal P1, a gain control amplifier 1 amplifies the input video intermediate frequency signal by a video gain control voltage and then outputs an amplified signal. A gain control voltage detecting circuit 2, which receives the amplified video intermediate frequency signal from the gain control amplifier 1, detects a gain control voltage from a video carrier signal and outputs the detected gain control voltage to a lockout stopping circuit 3. A video detecting circuit 4, which receives the amplified video intermediate frequency signal from the gain control amplifier 1, detects a video signal and outputs the detected video signal. The lockout stopping circuit 3, which receives the detected video signal from the video detecting circuit 4, compares the detected video signal with a predetermined reference level value and then detects whether the comparing result corresponds to a normal state or an abnormal state. If a normal state is detected, the gain control voltage detected from the gain control voltage detecting circuit 2 is output to the gain control amplifier 1. If an abnormal state is detected, a predetermined reference voltage is applied to the gain control amplifier 1. As a result, lockout occurring when the gain is controlled can be prevented.

The conventional AGC circuit, as described above, has the disadvantage wherein an accurate gain control voltage cannot be detected because the gain control voltage is derived from a video intermediate frequency signal. The AGC circuit is ineffective in that a sample and a hold circuit must be added thereto although the gain control voltage is detected using a synchronizing signal.

SUMMARY OF THE INVENTION

It is therefore an object of the present invention to provide an automatic gain control circuit which automatically produces a stable gain without an occurrence of lockout in a video processing system.

Another object of the present invention is to provide an automatic gain control circuit which automatically controls the gain of a video intermediate frequency signal according to a sound gain control voltage in a video processing system.

These and other objects, features and advantages of the present invention are provided by an automatic gain control circuit including a first gain control amplifier for receiving a video intermediate frequency signal, for amplifying the signal according to a sound gain control voltage, and for then providing the amplified video intermediate frequency signal, a second gain control amplifier receiving a carrier signal having a sound intermediate frequency signal and a video intermediate frequency signal, for amplifying the carrier signal according to the sound gain control voltage, and for then providing the amplified carrier signal, and a sound gain control voltage detecting circuit receiving the amplified carrier signal from the second gain control amplifier, for detecting the sound gain control voltage, and for then providing the detected sound gain control voltage.

These and other objects, features and advantages of the present invention are provided by a method for operating an automatic gain control circuit having a first gain control amplifier receiving a video intermediate frequency signal and producing an amplified video intermediate frequency signal responsive to an applied first gain control voltage, and a second gain control amplifier receiving a carrier signal having a sound intermediate frequency signal and the video intermediate frequency signal and producing an amplified carrier signal responsive to an applied second gain control voltage. Advantageously, the method of operation includes steps for receiving the amplified carrier signal from the second gain control amplifier, detecting a sound gain control voltage, and providing the detected sound gain control voltage to the first gain control amplifier as the first gain control voltage.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENT

Figure 1:
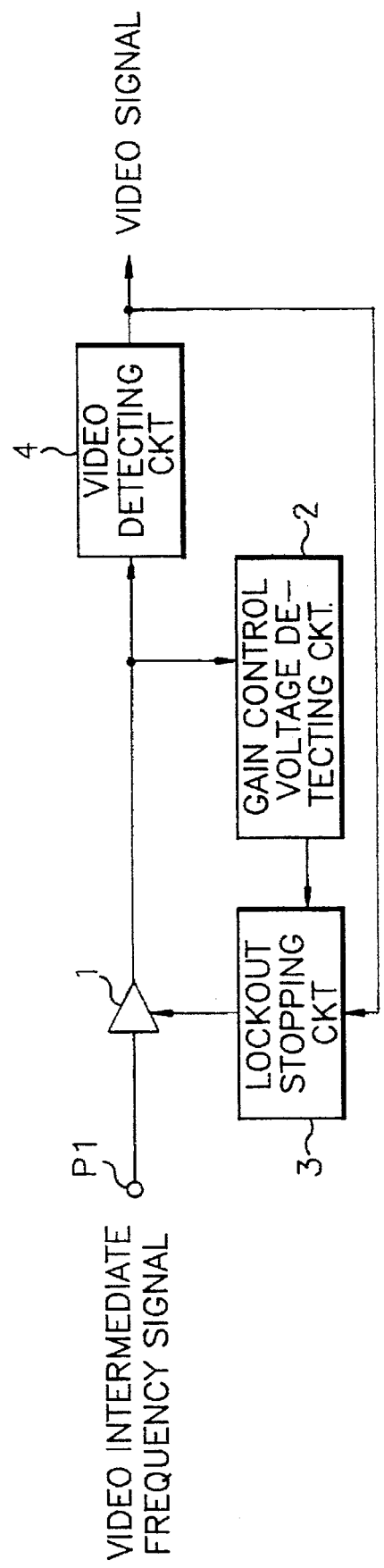
FIG. 1 is a high level block diagram of a conventional automatic gain control circuit.
Figure 2:
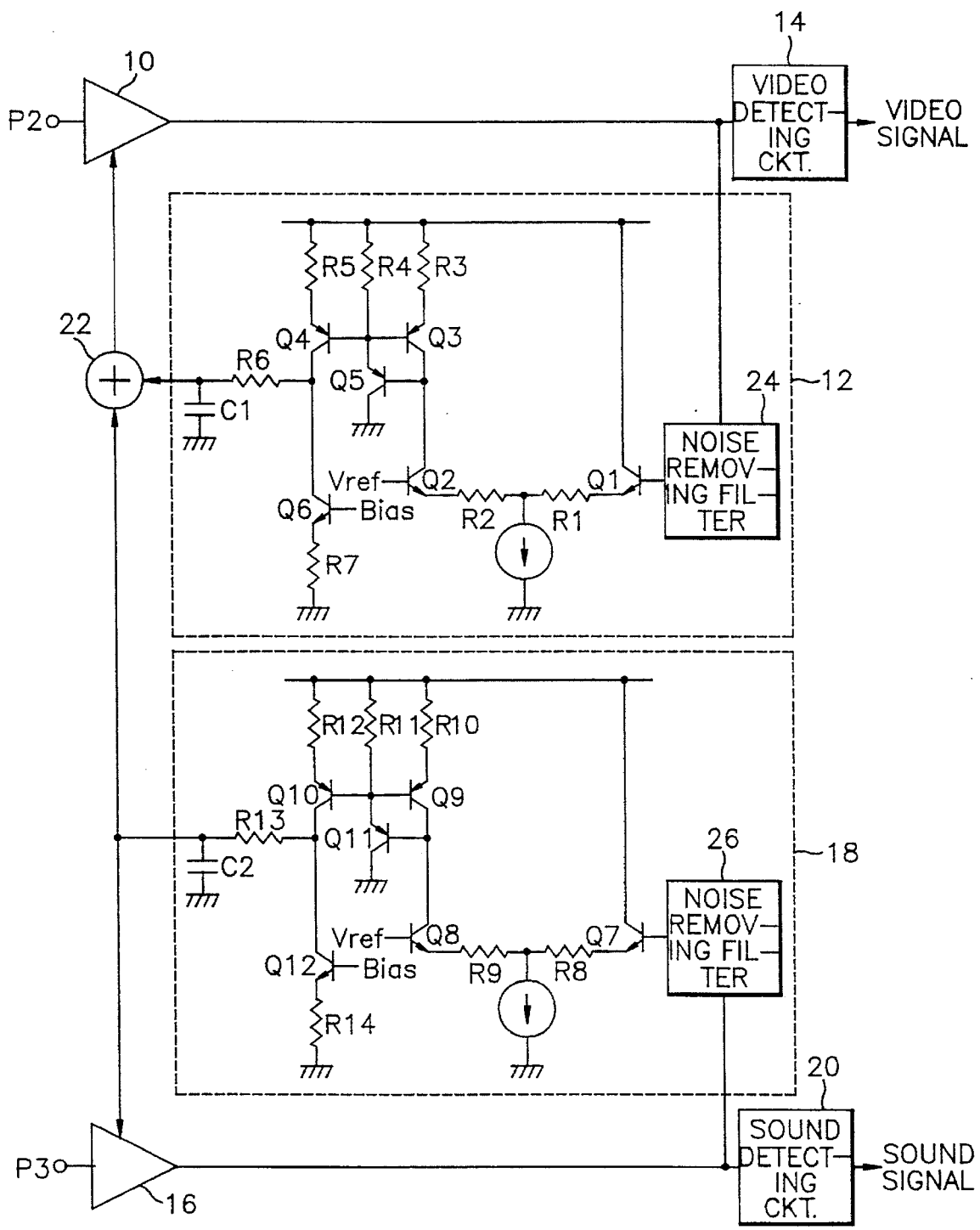
FIG. 2 is a detailed circuit diagram, partially in block form, of an automatic gain control circuit according to the present invention.

FIG. 2 is a circuit diagram of an automatic gain control circuit according to the present invention, wherein a first gain control amplifier 10 receives a video intermediate frequency signal from an input terminal P2, amplifies the signal according to a selected gain control voltage, and then outputs the amplified video intermediate frequency signal. A video gain control voltage detecting circuit 12 detects a video gain control voltage from the amplified video intermediate frequency signal output by the first gain control amplifier 10. A sound gain control voltage detecting circuit 18 receives an amplified signal from a second gain control amplifier 16, detects a sound gain control voltage and then outputs the detected sound gain control voltage. An adder 22 adds the video gain control voltage detected by the video gain voltage detecting circuit 12 to the sound gain control voltage detected by the sound gain control voltage detecting circuit 18 and then supplies the added voltage to the first gain control amplifier 10. A video detecting circuit 14 receives the amplified signal from the first gain control amplifier 10 and outputs a video detecting signal. The second gain control amplifier 16 receives a sound intermediate frequency signal, amplifies the signal by the sound gain control voltage, and then outputs the amplified sound intermediate frequency signal. A sound detecting circuit 20 receives the amplified signal from the second gain control amplifier 16 and outputs a sound detecting signal.

A preferred embodiment according to the present invention will now be described in greater detail with reference to the above-described FIG. 2.

When the video intermediate frequency signal is input through the input terminal P2, the first gain control amplifier 10 amplifies the input video intermediate frequency signal according to the selected gain control voltage and outputs the amplified video intermediate frequency signal. At this time, a noise removing filter 24 in the video gain voltage detecting circuit 12 removes noise, such as impulse noise, from the amplified video signal output from the first gain control amplifier 10 and outputs a video signal from which noise is removed.

The video signal from which noise is removed is advantageously applied to a base of a transistor Q1. At this time, a reference voltage Vref is applied to a base of a transistor Q2. Thus, the signal applied to the base of the transistor Q1 is amplified by a difference between the signal and the reference voltage by the transistors Q1 and Q2. The amplified signal is then output to a collector of the transistor Q2. Preferably, when current flows to the collector of the transistor Q2, current also flows equally to a collector of a transistor Q3. Then, current flowing to a collector of a transistor Q4 becomes equal to the current flowing to the collector of the transistor Q3.

Advantageously, a constant bias is applied to a base of a transistor Q6 from a video amplifying control stage (not shown), whereby the transistor Q6 is driven. When the transistor Q6 is driven, the signal applied to the collector of the transistor Q4 is filtered by a resistor R6 and a capacitor C1. The filtered signal is then applied to the selected gain control voltage output by the adder 22. The video gain control voltage detecting circuit 12 advantageously detects the video gain control voltage from the amplified carrier signal output by the first gain control amplifier 10 and outputs the detected video gain control voltage to the adder 22. From FIG. 2, it will be appreciated that the video detecting circuit 14, which receives the amplified video intermediate frequency signal from the gain control amplifier 10, detects the video signal and outputs the detected video signal.

Preferably, when a carrier signal having a sound intermediate frequency signal and a video intermediate frequency signal is input through an input terminal P3, the second gain control amplifier 16 amplifies the carrier signal according to the sound gain amplifying control voltage and outputs the amplified carrier signal. At this time, the noise removing filter 26 removes noise, such as impulse noise, from the amplified sound signal output from the second gain control amplifier 16 and outputs the sound signal from which noise is removed.

The sound signal from which noise is removed is applied to a base of a transistor Q7. Advantageously, a reference voltage can be applied simultaneously to a base of a transistor Q8. Thus, the signal applied to the base of the transistor Q7 is amplified by a difference between that signal and the reference voltage by the transistors Q7 and Q8 and then the amplified signal is output to the transistor Q8. When current flows to the Collector of the transistor Q8, current also flows equally to a collector of a transistor Q9. Preferably, current flowing to a collector of a transistor Q10 becomes equal to the current flowing through the collector of transistor Q9. Advantageously, a constant bias voltage is applied to a base of transistor Q12 from a sound amplifying control stage (not shown), whereby the transistor Q12 is driven. When the transistor Q12 is driven, the signal applied to the collector of the transistor Q12 is filtered by a resistor R13 and a capacitor C2. The filtered signal is preferably then applied to the selected gain control voltage of the adder 22 and to the second gain control amplifier 16. In short, the sound gain control voltage detecting circuit 18 detects the sound gain control voltage from the amplified sound carrier signal output from the second gain control amplifier 16 and outputs the detected sound gain control voltage to the adder 22 and the second gain control amplifier 16, respectively.

Advantageously, the adder 22 adds the video gain control voltage output from the video gain control voltage detecting circuit 12 to the sound gain control voltage output from the sound gain voltage control detecting circuit 18 and supplies the sum of the added voltages as the selected gain control voltage to the first gain control amplifier 10. Preferably, the second gain control amplifier 16 controls the gain of a sound signal according to the sound gain control voltage output from the sound gain control voltage detecting circuit 18 and amplifies the sound signal. However, since the video gain control voltage output from the video gain control voltage detecting circuit 12 generates a control voltage to control the gain only when the video intermediate frequency signal is over-amplified by the first gain control amplifier 10, when the video intermediate frequency signal is not over-amplified, the first and the second gain control amplifiers 10 and 16 control gain according to the sound gain control voltage output from the sound gain control voltage detecting circuit 18. Preferably, a sound detecting circuit 20 which receives the amplified video and sound intermediate frequency signals output from the second gain control amplifier 16, detects the sound signal, and outputs the detected sound signal.

As described above, in an automatic gain control circuit of a video processing system, there is provided an advantage that when the gain of the intermediate frequency signal is controlled, the sound gain control voltage is detected from the carrier signal including both the video intermediate frequency signal and the sound intermediate frequency signal, so that the gains of the video intermediate frequency signal and the sound intermediate frequency signal are automatically controlled by the detected sound gain control voltage, to thereby provide a more stable gain control while precluding the occurrence of lockout.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An automatic gain control circuit of a video processing system comprising:

first gain control amplifying means receiving a video intermediate frequency signal, for amplifying said video intermediate frequency signal according to a sound gain control voltage thereby providing an amplified video intermediate frequency signal;

second gain control amplifying means receiving a carrier signal having a sound intermediate frequency signal and said video intermediate frequency signal, for amplifying said carrier signal by said sound gain control voltage and then providing the amplified carrier signal; and sound gain control voltage detecting means receiving the amplified carrier signal from said second gain control amplifying means, for detecting the sound gain control voltage and then providing the detected sound gain control voltage.

2. The automatic gain control circuit as claimed in claim 1, further comprising video gain control voltage detecting means for detecting a video gain control voltage from the amplified video intermediate frequency signal output from said first gain control amplifying means and for providing the detected video gain control voltage to said first gain control amplifying means when an over-amplified video signal is output from said first gain control amplifying means.

3. The automatic gain control circuit as claimed in claim 2, further comprising means for summing said sound gain control voltage and said video gain control voltage, wherein said first gain control amplifying means is controlled responsive to the video gain control voltage output from said video gain control voltage detecting means, when said over-amplified video signal is output from said first gain control amplifying means.

4. The automatic gain control circuit as claimed in claim 2, further comprising:

video detecting means receiving said amplified video intermediate frequency signal output from said first gain control amplifying means for providing a video detecting signal; and sound detecting means receiving said amplified carrier signal output from said second gain control amplifying means for providing a sound detecting signal.

5. An automatic gain control circuit of a video processing system comprising:

gain control amplifying means receiving a carrier signal having a sound intermediate frequency signal and a video intermediate frequency signal, for amplifying said carrier signal by a sound gain control voltage and for then providing the amplified carrier signal having a sound and a video component; and sound gain control voltage detecting means receiving the amplified signal from said gain control amplifying means, for detecting a sound gain control voltage and for supplying the detected sound gain control voltage.

6. The automatic gain control circuit as claimed in claim 5, further comprising sound detecting means receiving the amplified carrier signal output from said gain control amplifying means for providing a sound detecting signal.

7. A method for operating an automatic gain control circuit of a video processing system having a first gain control amplifier receiving a video intermediate frequency signal and producing an amplified video intermediate frequency signal responsive to an applied first gain control voltage, and a second gain control amplifier receiving a carrier signal having a sound intermediate frequency signal and the video intermediate frequency signal and producing an amplified carrier signal responsive to an applied second gain control voltage, said method comprising the steps of:

(a) receiving the amplified carrier signal from said second gain control amplifier;

(b) detecting a sound gain control voltage; and (c) providing the detected sound gain control voltage to said first gain control amplifier as said first gain control voltage.

8. The method according to claim 7, further comprising the steps of:

(d) receiving the amplified video intermediate frequency signal from said first gain control amplifier; and (e) detecting a video gain control voltage;

wherein said step (c) comprises:

(c) providing the detected sound gain control voltage and the detected video gain control voltage to said first gain control amplifier as said first gain control voltage.

9. The method according to claim 8, wherein the detected sound gain control voltage and the detected video gain control voltage are provided to said first gain control amplifier as said first gain control voltage when an over-amplified video signal is output from said first gain control amplifier.

10. The method according to claim 7, wherein said first gain control voltage is not equal to said second gain control voltage when an over-amplified video signal is output from said first gain control amplifier.

* * * * *